US007501977B2

(12) United States Patent  
Ino

(10) Patent No.: US 7,501,977 B2  
(45) Date of Patent: Mar. 10, 2009

(54) MODE S RADAR

(75) Inventor: Masami Ino, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

(21) Appl. No.: 11/764,978

(22) Filed: Jun. 19, 2007

(65) Prior Publication Data

US 2008/0106455 A1 May 8, 2008

(30) Foreign Application Priority Data

Jun. 23, 2006 (JP) ............................. 2006-173462  
May 1, 2007 (JP) ............................. 2007-121013

(51) Int. Cl.  
G01S 13/91 (2006.01)  
G01S 13/74 (2006.01)  
G01S 13/93 (2006.01)  
(52) U.S. Cl. ............................ 342/37; 342/38; 342/32  
(58) Field of Classification Search .............. 342/29–40  
See application file for complete search history.

(56) References Cited

U.S. PATENT DOCUMENTS

2008/0106455 A1 5/2008 Ino

FOREIGN PATENT DOCUMENTS

JP 2007-33408 2/2007

OTHER PUBLICATIONS

Eurocontrol: "Principles of Mode S Operation and Interrogator Codes", European Organisation for the Safety of Air Navigation, XP-002454133, Mar. 18, 2003, pp. I-IV and pp. 1-31.  
P. Giustiniani, et al., "Improvements in code validation algorithms for Secondary Surveillance radar", Radar 92. International Conference Brighton, XP-006514783, 1992, pp. 143-146.  
M. C. Stevens, "Secondary Surveillance Radar" Secondary Surveillance Radar, Norwood, Artech House, XP-002454134, 1988, pp. 251-276.  
Yoshio Hashida, et al., "Secondary Surveillance Radar for Air Traffic Control-SSR Mode S," Toshiba Review, vol. 59, No. 2, 2004, pp. 58-61.  
Fumiki Horikoshi, et al., "Modified ACAS RA downlink implementation plan in Japan," ICAO Surveillance and Conflict Resolution Systems Panel (SCRSP) Working Group-B, WP/B/5-30-I, May 12-May 16, 2003, pp. 2-6 and 1 cover page.  
U.S. Appl. No. 12/180,713, filed Jul. 28, 2008, Ino.

*Primary Examiner*—Thomas H Tarcza  
*Assistant Examiner*—Cassi Galt  
(74) *Attorney, Agent, or Firm*—Oblon, Spivak, McClelland, Maier & Neustadt, P.C.

(57) ABSTRACT

Disclosed is a Mode S radar which specifies an aircraft by transmitting interrogations to an aircraft A equipped with a Mode S transponder, and by then receiving and decoding replies corresponding to these interrogations. In the Mode S radar, detection reports on the aircraft A are generated in a manner that: for a Mode A code necessary for generating detection reports, when identicalness between the Mode A codes obtained in a plurality of scans after the initial acquisition of the aircraft A has been found to exist, the Mode A code thus found identical is adopted without carrying out a Mode A code interrogation (UF=5) thereafter. Accordingly, the Mode S secondary surveillance capable of generating more highly reliable detection reports is achieved.

4 Claims, 9 Drawing Sheets

MODE S RADAR

CROSS REFERENCE TO RELATED APPLICATION

The present application claims the benefit of priority under 35 U.S.C. § 119 to Japanese Patent Applications No. 2006-173462, filed on Jun. 23, 2006 and No. 2007-121013, filed on May 1, 2007, the entire contents of which are incorporated herein by reference.

BACKGROUND OF THE INVENTION

1. Field of the Invention

The present invention relates to improvements on a Mode S radar which identifies an aircraft by receiving a reply to a Mode-S interrogation having been transmitted to a Mode-S transponder installed in the aircraft, and by then decoding a signal of the reply.

2. Description of the Related Art

Radars for aircraft surveillance, which are used for air traffic control over air routes and airspaces surrounding airports, are broadly divided into a primary surveillance radar (PSR) and a secondary surveillance radar (SSR).

The secondary surveillance radar (SSR) is designed to obtain various kinds of information on an aircraft by transmitting interrogations from an interrogator placed on the ground toward a transponder installed in the aircraft, and by then receiving and decoding replies from the aircraft to the interrogations.

Interrogations of the secondary surveillance radar are categorized into Mode A, Mode C and Mode S on the basis of kinds of information to be obtained. Mode A is used for obtaining identification (ID) information on an aircraft, which information is expressed in the form of a 4-digit number, while Mode C is used for obtaining altitude (ALT) information on an aircraft.

Mode S is capable of obtaining Mode-A code information, altitude information, route information and velocity information on an aircraft by using a selective interrogation, in addition to a 24-bit address information and positional information on the aircraft, which are obtained by using a Mode S only all-call interrogation. Moreover, Mode S has a ground-to-air data link communications function.

As described in "Secondary Surveillance Rader for Air Traffic Control—SSR Mode S" edited by Yoshio Hashida, Hisashi Ohtomo and Yoshinori Kuji (Toshiba Review Vol. 59 No. 2 (2004), pp. 58-61), the Mode S radar transmits a Mode S only all-call interrogation and Mode S selective interrogations so as to accomplish an initial acquisition of an aircraft equipped with a Mode S transponder and ordinary surveillance following the initial acquisition. Additionally, a parity checking function is incorporated in each of Mode S interrogation signals and reply signals so that each of the reply signals can be decoded with a bit error rate of $10^{-7}$.

A conventional Mode S radar is configured as shown in FIG. 1. The Mode S radar includes a transmission/reception antenna 1, a transmission/reception switch 2, a transmitter 3, a receiver 4, a signal processor 5, a correlation processor 6 and a transmission controller 7. The antenna 1 is capable of performing rotational scans. The transmission/reception switch 2 is connected to the antenna 1. The transmitter 3 and the receiver 4 which are connected to the transmission/reception switch 2. The signal processor 5 is connected to the transmitter 3 and the receiver 4, and schedules interrogations and replies. The correlation processor 6 is connected to the signal processor 5, and the transmission controller 7 is connected to the correlation processor 6. Here, a so-called interrogator is composed of the transmitter 3, the receiver 4, the signal processor 5 and the correlation processor 6.

Mode S interrogations scheduled by the signal processor 5 include a Mode S only all-call interrogation and Mode S selective interrogations. Each of the Mode S interrogation thus scheduled is transmitted toward an aircraft (that is, an aircraft equipped with a Mode S transponder) A through the transmitter 3, the transmission/reception switch 2 and the antenna 1. The thus transmitted interrogation is received by a transponder A2 through an aerial A1 of the aircraft A. A Mode S reply from the transponder A2, which corresponds to the Mode S interrogation from the Mode S radar, is transmitted toward the antenna 1 through the aerial A1 in return.

The mode S reply received by the antenna 1 is fed to the signal processor 5 sequentially through the transmission/reception switch 2 and the receiver 4 so as to be decoded by the signal processor 5. Meanwhile, it is judged whether or not the thus decoded reply should be subjected to processing in the own radar site, and the reply judged to be subjected to the processing is fed to the correlation processor 6. The correlation processor 6 includes an operation processing circuit 61 and a memory (a memory circuit) 62 which are formed of a computer, generates a detection report (that is, a target message) on the aircraft A by operation processing accompanied with storing into and reading out from the memory 62, and then feeds the detection report to the transmission controller 7.

An operation procedure of the abovementioned conventional Mode S radar will be described on the basis of a flowchart shown in FIG. 2 and with reference to a block diagram in FIG. 1 and a sequence of interrogations and replies which is shown in FIG. 3. As shown in FIG. 2, the Mode S radar transmits a Mode S only all-call interrogation (UF=11) at constant intervals through an entire cycle in every scan (step S101), and the aircraft A (the mode S transponder) returns a reply upon reception of the Mode S only all-call interrogation. A Mode S address and positional information are obtained from each of replies (DF=11) received from the aircraft A which are obtained in a plurality of scans (the first scan and the second scan) so as to judge whether or not initial acquisition has been accomplished by the correlation processor 6 (step S102). In general, the initial acquisition of the aircraft A is performed on the basis of a correlation between tracking data obtained from two successive scans, and data on a position (a distance and a direction) and data on a unique Mode S address of the aircraft A.

When judgment is YES in step S102, that is, when the initial acquisition is accomplished, the signal processor 5 schedules and transmits Mode S selective interrogations (UF=4 and UF=5) in order to obtain altitude information and Mode A code information on the aircraft A in a scan (a third scan) following the initial acquisition. Thereafter, the signal processor 5 obtains positional information including the altitude information on the aircraft A, and the Mode A code information, and then feeds the information to the operation processing circuit 61 of the correlation processor 6 (step S103).

When judgment is NO in step S102, that is, when the initial acquisition is not accomplished, detection of replies (DF=11) corresponding to the Mode S only all-call interrogation (DF=11) in step S101 is always executed, and the process moves on to step S103 only after the initial acquisition has been performed on the basis of the plurality of scans.

After step S103, positional information and altitude information are obtained with a Mode S selective interrogation (UF=4), a detection report on the aircraft A is generated from these information, and data of a Mode A code stored in the memory 62 of the correlation processor 6, and is transmitted toward an unillustrated air traffic control system through the transmission controller 7 (step S104).

In order to continuously surveil the aircraft A in each of scans (fourth and later scan) following the scan (the third scan) of step S103, the MODE S RADAR transmits the Mode S selective interrogation (UF=4) used for obtaining positional information including altitude information, and receives and decodes a reply from the aircraft A corresponding to the thus transmitted Mode S selective interrogation (UF=4). Meanwhile, the correlation processor 6 generates a detection report on the basis of the positional information on the aircraft A, which includes the altitude information thereof, having been obtained by thus decoding the reply, and also on the basis of the data of the Mode A code having been previously obtained and stored in the memory 62, and transmits the detection report toward the unillustrated air traffic control system through the transmission controller 7 (step S106).

In this manner, in the conventional Mode S radar, data of the Mode A code obtained in surveillance in the initial scan (the third scan) immediately after the initial acquisition is stored in the memory 62. In addition, the detection report is generated in surveillance in each of the subsequent scans (the fourth and later scans) by reading out and utilizing the Mode A code thus stored in the memory 62. Accordingly, in each of the abovementioned fourth and later scans, a Mode A code requesting interrogation (UF=5) and a reply thereto are omitted. For this reason, the necessity of using an RF channel between the Mode S radar and the aircraft A in connection with the otherwise transmitted Mode A code requesting interrogation (UF=5) is eliminated. As a result, utilization of the RF channel can be expanded into data link communications and the like, and furthermore, more efficient utilization of a beam dwell time can be achieved.

In the above description, it has been described, that the mode A code obtained in the first scan (the third scan) after the initial acquisition is stored, and that reading and utilization of the thus stored mode A code is continued in the subsequent scans. However, note that, even for the mode A code, which is previously set for the aircraft before takeoff, and which basically is not changed, the Mode S code selective interrogation (UF=5) used for obtaining the Mode A code is carried out, for example, at the time when the flight status information has changed due to an Alert status brought about with a Mode A code altering operation by a pilot, or when the tracking of the aircraft A is lost midway through the tracking.

Additionally, although the above described Mode A code has been referred to as ID of a Mode-S-transponder-equipped aircraft, that is, the identification number of a Mode-S-transponder-equipped aircraft, it is sometimes referred to as a discrete beacon code (DBS).

As has been described above, in the conventional Mode S radar, the Mode A code obtained in the initial scan (the third scan) immediately after the accomplishment of the initial acquisition of the aircraft A in the plural scans (the first and second scans) is stored in the memory 62. Additionally, in the surveillance of the aircraft A in each of the fourth and later scans, the stored Mode A code is read out every time when necessary as long as there is no change in flight status of the aircraft, and is utilized in the generation of a detection report (a target message) along with the altitude information and the positional information which are acquired with the Mode S selective interrogation (UF=4).

However, unlike surveillance by using Mode A/C, a Mode A code necessary for detection report generation in the Mode S secondary surveillance is obtained by reading out the data, which has been obtained in one scan after the accomplishment of the initial acquisition, and which has been then stored in the memory. For this reason, there has been the following problem. Specifically, if there is an error in the stored data of the Mode A code, a serious adverse effect occurs on air traffic control because detection reports are continuously generated, even in the MODE S RADAR having an error rate of $10^{-7}$.

In a case where the Mode S selective interrogation for obtaining the Mode A code is supposed to be carried out in every scan as in the case with a conventional Mode A/C radar in order to avoid this problem, incorrect Mode A code data cannot be outputted over a long period of time even if the incorrect Mode A code data has been detected as a normal code for a rare occasion. However, in a system having such a configuration, the number of interrogations and replies to and from the same Mode-S-transponder-equipped aircraft is double that in the current system. For this reason, the occupation time of RF channel is increased, and therefore, when efficient utilization of data links which will be prevalent in the future, is taken into consideration, a harmful effect of decreasing a channel time allocated to exchanges of data link information is expected. Accordingly, there has been a problem of causing an adverse effect on adequate exchanges of user data between air and ground.

SUMMARY OF THE INVENTION

The invention was made in consideration of the above described problems in the conventional technique. An object of the invention is to provide a Mode S radar, in which incorrect detection of data of a Mode A code necessary for detection report generation is reduced more than ever, and which is more highly reliable.

One aspect of the present invention is a Mode S radar which specifies an aircraft by transmitting an interrogation to a Mode S transponder installed in an aircraft, by receiving a reply to the interrogation, and by then decoding the content of the received reply. This Mode S radar is characterized by including acquisition means, first obtainment means, second obtainment means, judgment means and generation means. The acquisition means transmits a Mode S only all-call interrogation, and thereby accomplishes an initial acquisition of an aircraft equipped with a Mode S transponder (a Mode-S-transponder-equipped aircraft). The first obtainment means transmits UF=4 interrogations as Mode S selective interrogations to the Mode-S-transponder-equipped aircraft with the initial acquisition having been accomplished by the acquisition means, and which thereby obtains DF=4 replies from the Mode-S-transponder-equipped aircraft. The second obtainment means, until an identicalness judgment is issued, transmits UF=5 interrogations as Mode S selective interrogations with each UF=4 interrogation to the Mode-S-transponder-equipped aircraft, and which thereby obtains Mode A codes as DF=5 replies from the Mode-S-transponder-equipped aircraft. The judgment means judges whether or not identicalness exists between the plural Mode A codes obtained by the second obtainment means, and issued the identicalness to the second obtainment means. The generation means stores, in a memory, data with which identicalness has been judged to exist by the judgment means, and then generates a report obtained by substituting the Mode A code with which identicalness has been judged to exist, as a detection report on the aircraft in each of scans following the obtainment.

According to the Mode S radar of this aspect of the present invention, for Mode A code data among data on the Mode-S-transponder-equipped aircraft after the initial acquisition, stored in the internal memory is data of the Mode A code with which agreement, that is, identicalness has been obtained by the Mode S selective interrogations over plural scans. Then the stored data is reflected in the detection report for each of the subsequent scans. Accordingly, the generated detection report is more accurate than otherwise, and as a result, reliability of aircraft surveillance can be considerably enhanced.

Additionally, another aspect of the present invention is a Mode S radar which specifies an aircraft by transmitting an interrogation to a Mode S transponder installed in an aircraft, by receiving a reply to the interrogation, and by then decoding the content of the received reply. The Mode S radar is characterized by including acquisition means, first obtainment means, scan counting means, second obtainment means and generation means. The acquisition means transmits a Mode S only all-call interrogation, and which thereby accomplishes an initial acquisition of an aircraft equipped with a Mode S transponder. The first obtainment means transmits UF=4 and UF=5 as Mode S selective interrogations to the Mode-S-transponder-equipped aircraft with the initial acquisition having been accomplished by the acquisition means, and which thereby obtains a Mode A code as a DF=5 reply from the Mode-S-transponder-equipped aircraft. The scan counting means counts the number of scans performed on the Mode-S-transponder-equipped aircraft after the initial acquisition. The second obtainment means transmits UF=4 and UF=5, as Mode S selective interrogations, to the Mode-S-transponder-equipped aircraft, every time the number of scans counted by the scan counting means reaches a preset optimal number of scans after a Mode A code is obtained by the first obtainment means, and thereby re-obtains a Mode A code as a new DF=5 reply from the Mode-S-transponder-equipped aircraft. The generation means generates a detection report on the aircraft.

According to the Mode S radar of this aspect of the present invention, for data of a Mode A code among data on the Mode-S-transponder-equipped aircraft after the initial acquisition, the Mode A code is repeatedly re-obtained with a Mode S selective interrogation every time the number of scans counted by the scan counting means reaches the preset optimal number of scans. For this reason, the Mode A code is reflected in a detection report for the subsequent scans. Accordingly, the generated detection report is more accurate than otherwise, and as a result, reliability of aircraft surveillance can be considerably enhanced.

DETAILED DESCRIPTION OF PREFERRED EMBODIMENTS

Embodiments of the present invention will be described in detail below on the basis of the drawings.

First Embodiment

Figure 1:
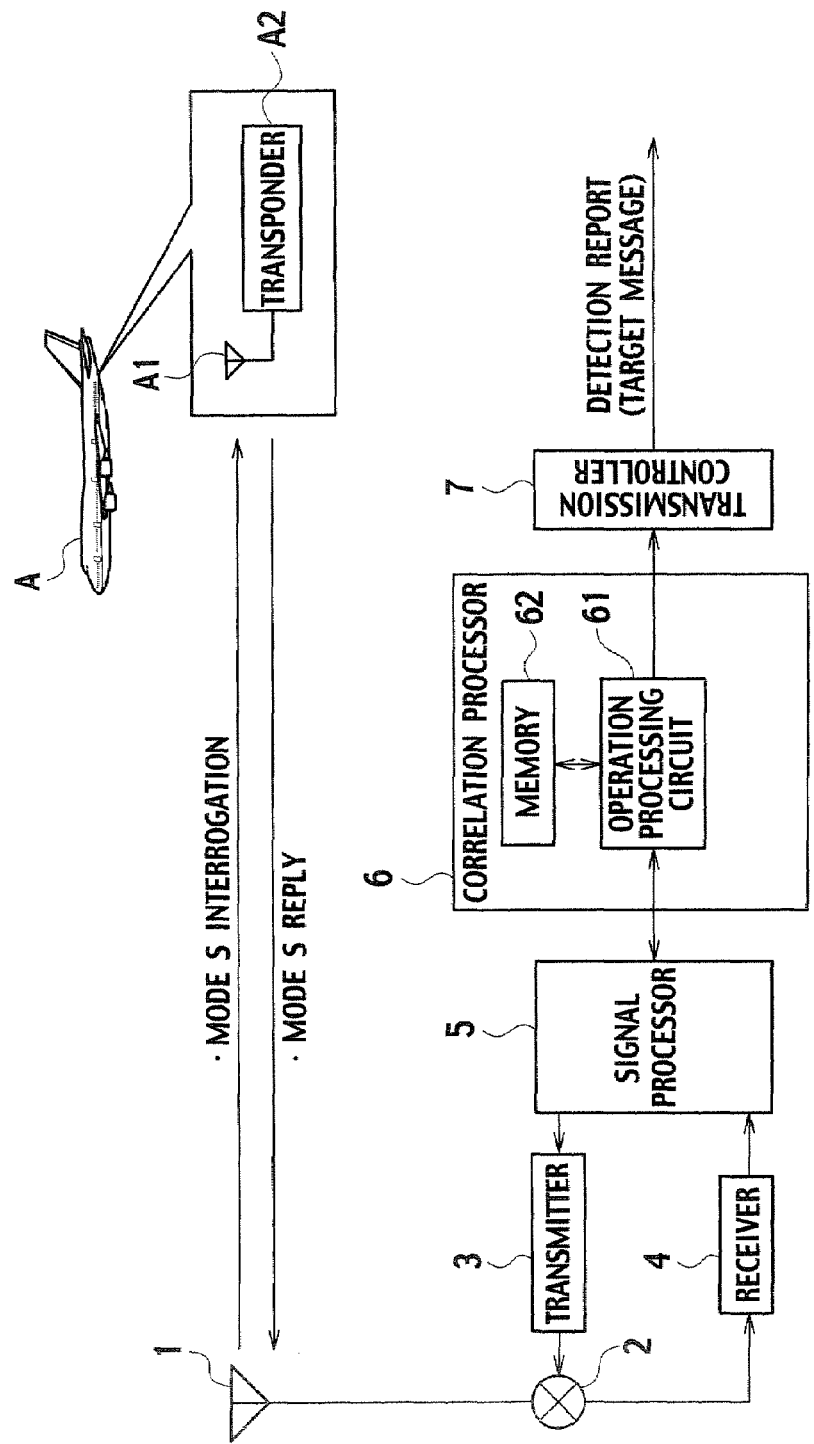
FIG. 1 is a block diagram of a conventional Mode S radar.
Figure 2:
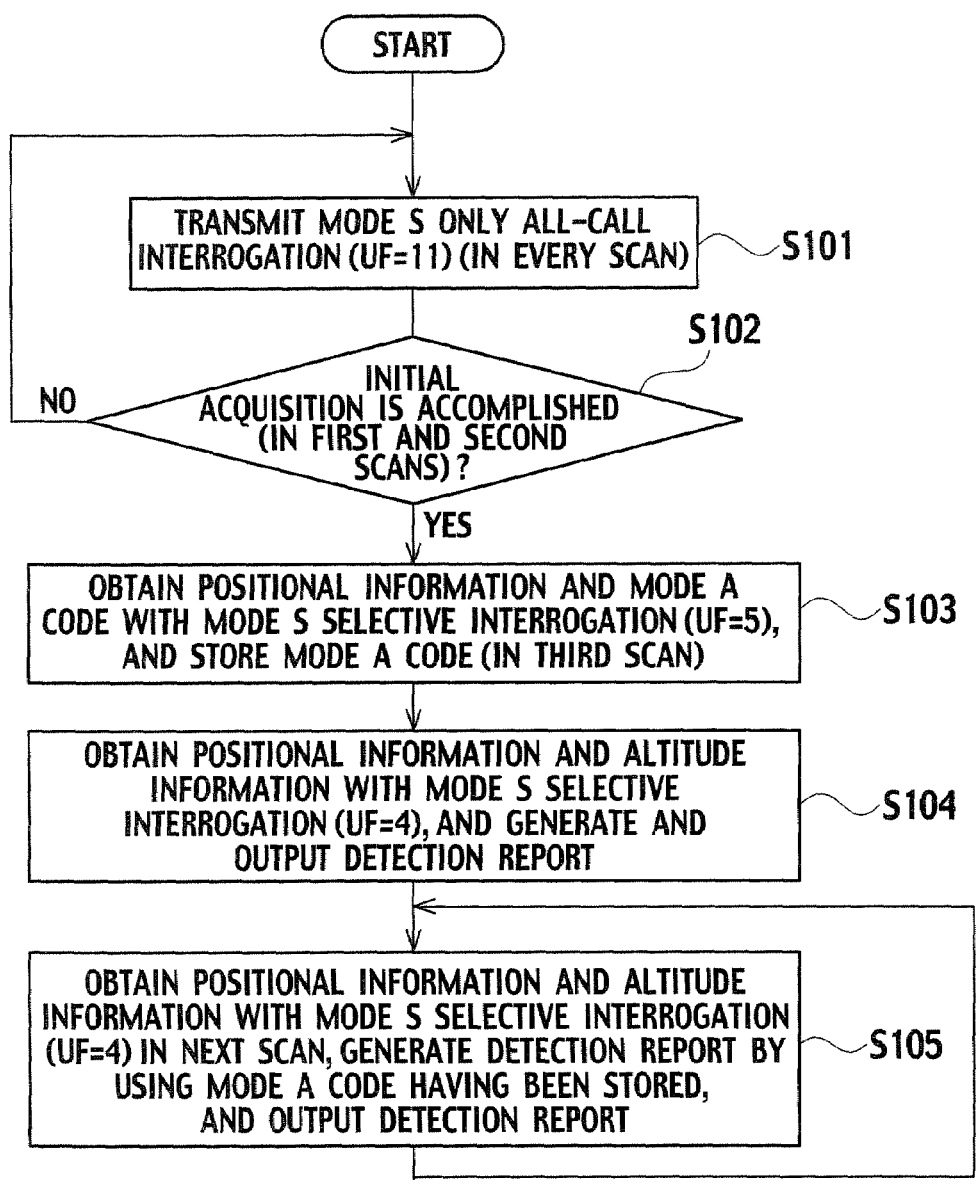
FIG. 2 is a flowchart showing a control procedure of the conventional Mode S radar.
Figure 3:
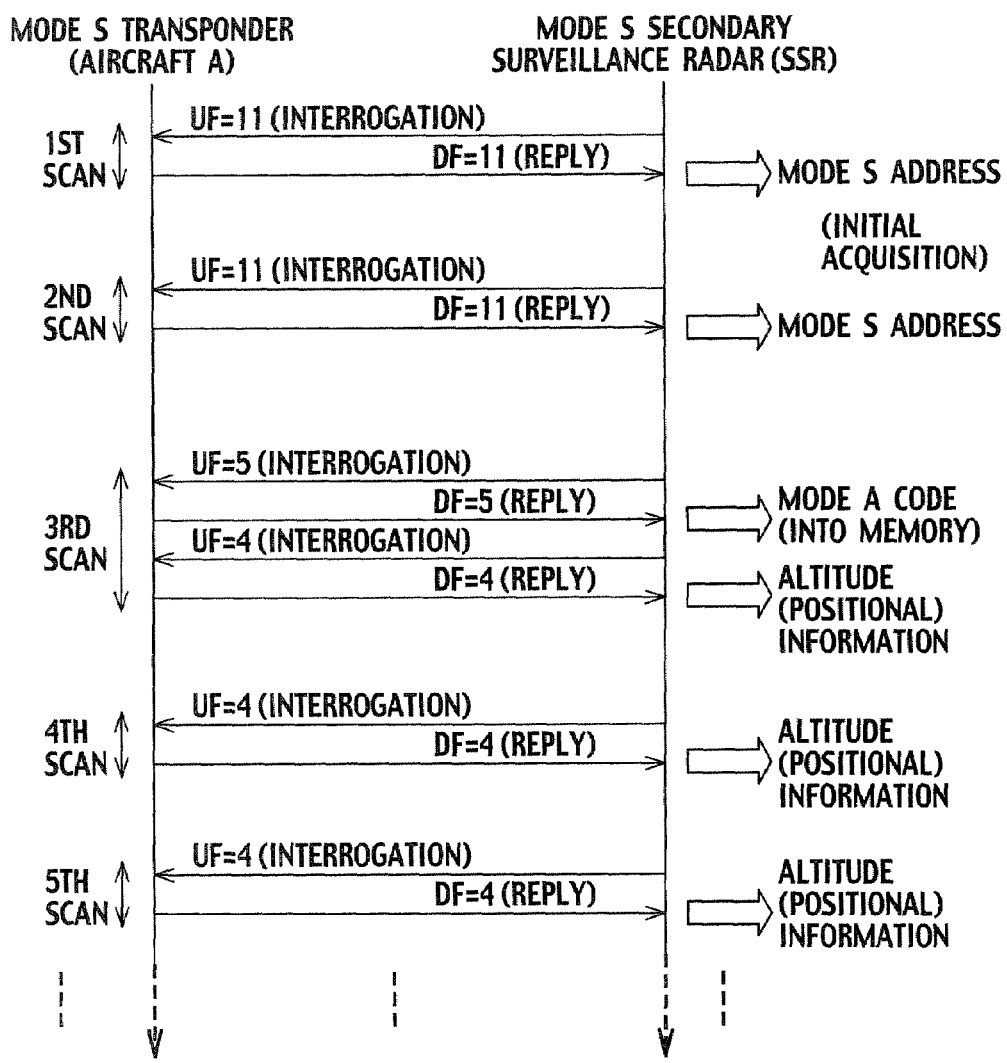
FIG. 3 is a sequence diagram showing a procedure for obtaining a Mode A code by the conventional Mode S radar.

A Mode S radar of a first embodiment of this invention will be described with reference to FIGS. 4 to 6. Note that corresponding reference numerals are given to elements therein corresponding with elements of the conventional Mode S radar shown in FIGS. 1 to 3, and detailed description thereon will be omitted.

Figure 4:
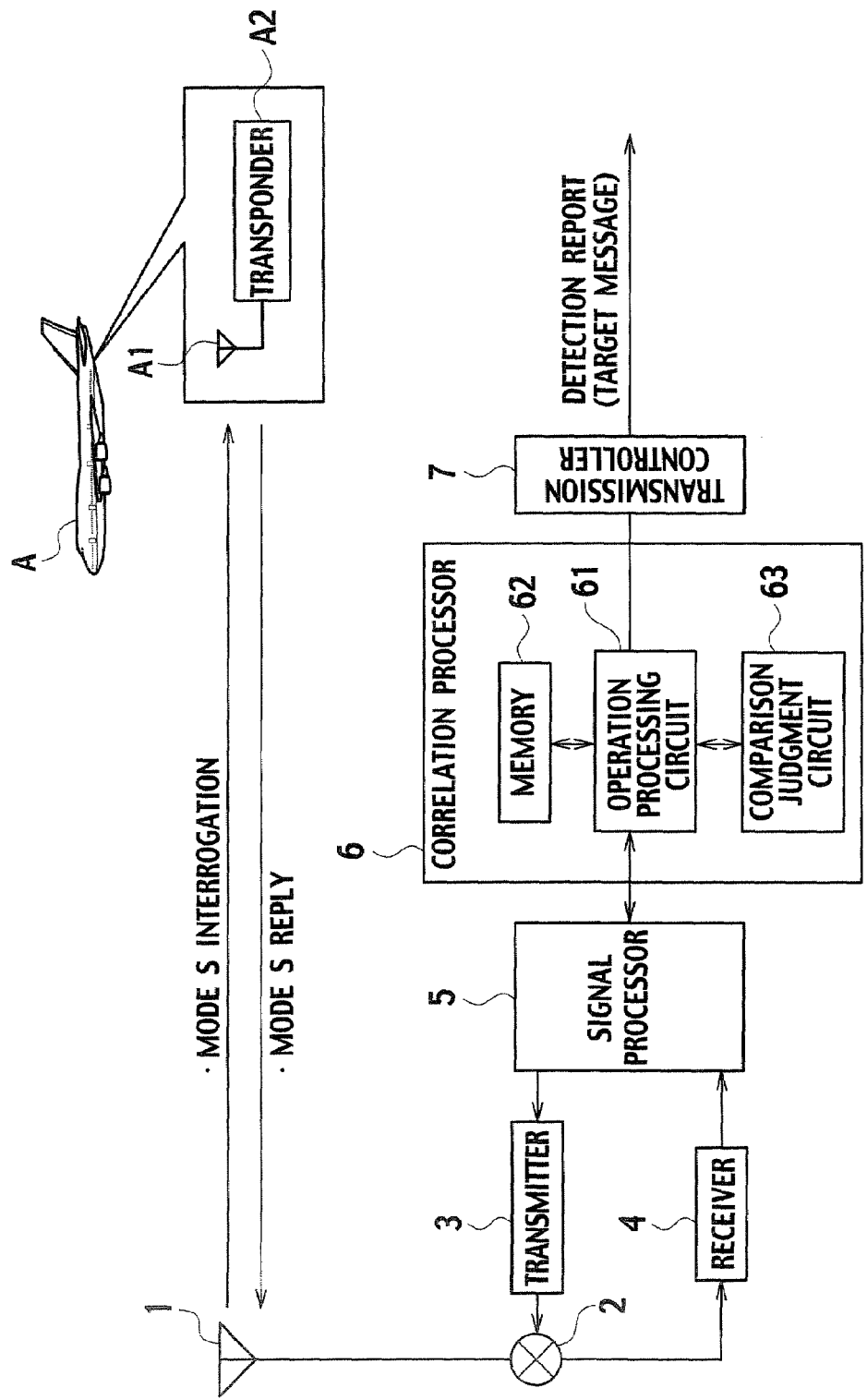
FIG. 4 is a block diagram of a Mode S radar of a first embodiment of the present invention.
Figure 5:
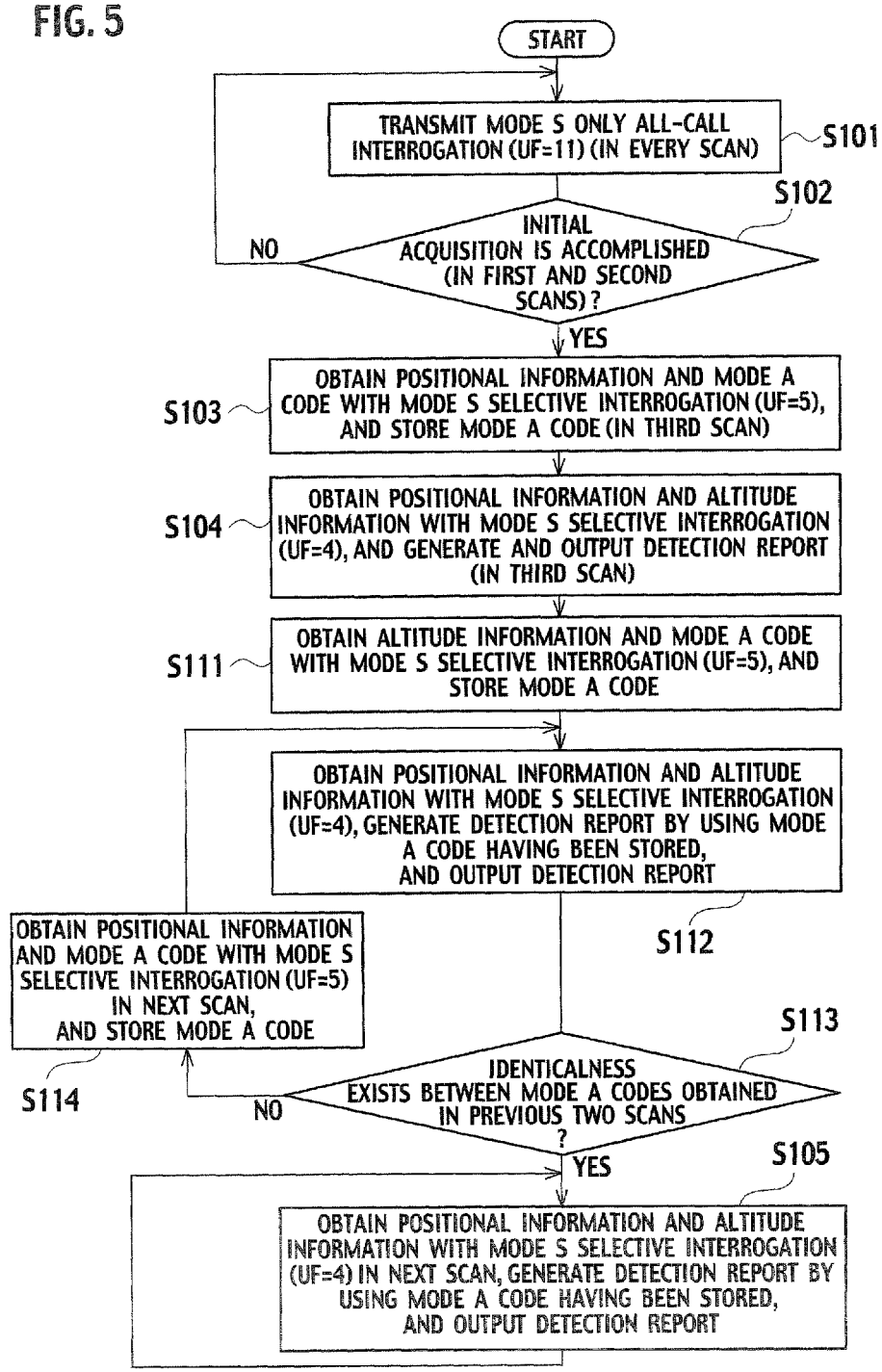
FIG. 5 is a flowchart showing a procedure for obtaining a Mode A code by the Mode S radar of the first embodiment.

The Mode S radar of the first embodiment shown in FIG. 4 includes a transmission/reception antenna 1, a transmission/reception switch 2, a transmitter 3, a receiver 4, a signal processor 5, a correlation processor 6 and a transmission controller 7. The transmission/reception antenna 1 is capable of performing rotational scans. The transmission/reception switch 2 is connected to the antenna 1. The transmitter 3 and the receiver 4 are connected to the transmission/reception switch 2. The signal processor 5 is connected to the transmitter 3 and the receiver 4. The correlation processor 6 is connected to the signal processor 5. The transmission controller 7 is connected to the correlation processor 6. The correlation processor 6 includes an operation processing circuit 61, a memory (a memory circuit) 62 and a comparison judgment circuit 63, which are formed of a computer.

Mode S interrogations (a Mode S only all-call interrogation and Mode S selective interrogations) scheduled by the signal processor 5 are transmitted toward an aircraft A through the transmitter 3, the transmission/reception switch 2 and the antenna 1. The transmitted Mode S interrogations are then received by a transponder A2 of the aircraft A through an aerial A1 thereof. After that, Mode S replies, corresponding to these Mode S interrogations, are transmitted in return from the transponder A2 toward the antenna 1 through the aerial A1.

The mode S replies received by the antenna 1 are fed to, and the signal processor 5 sequentially through the transmission/reception switch 2 and the receiver 4 to be decoded. Then, it is judged whether or not each of the thus decoded replies should be subjected to processing in the own radar site. The reply judged to be subjected to the processing is fed to the operation processing circuit 61 of the correlation processor 6.

After the aircraft A is initially acquired with the Mode S only all-call interrogation, the Mode S radar of this embodiment transmits not only an altitude requesting interrogation of UF=4 but also a Mode S selective interrogation of UF=5 for requesting Mode A code in each of plural scans of preset number. Then, a detection report on the aircraft A is generated on the basis of a Mode A code obtained from a reply from the transponder A2 of the aircraft A. At the same time, the comparison judgment circuit 63 judges whether or not a Mode A code obtained in each scan agrees with a Mode A code obtained in a scan prior to the scan. As a result of the comparison and judgment, if it is judged that these Mode A codes are identical, the Mode S selective interrogation (UF=5) for obtaining a Mode A code is not transmitted toward the aircraft A from the transmitter 3 in the subsequent scans. Instead, a Mode A code, which has been judged to be identical, and which has accordingly been stored in the memory 62, is read out. The read-out Mode A code is reflected in a detection report (a target report), and outputted.

Figure 6:
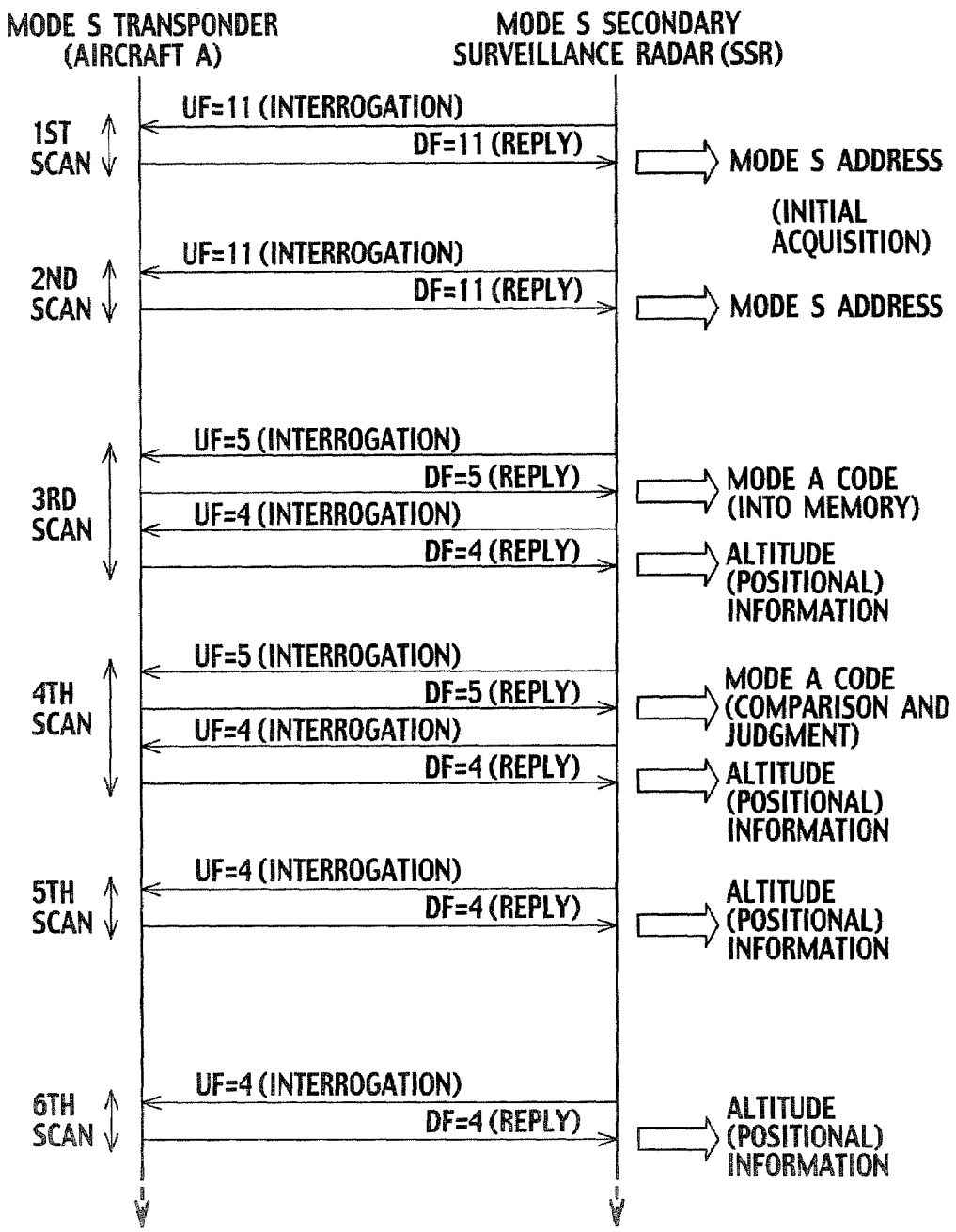
FIG. 6 is a sequence diagram showing the procedure for obtaining a Mode A code by the Mode S radar of the above-mentioned first embodiment.
Figure 8:
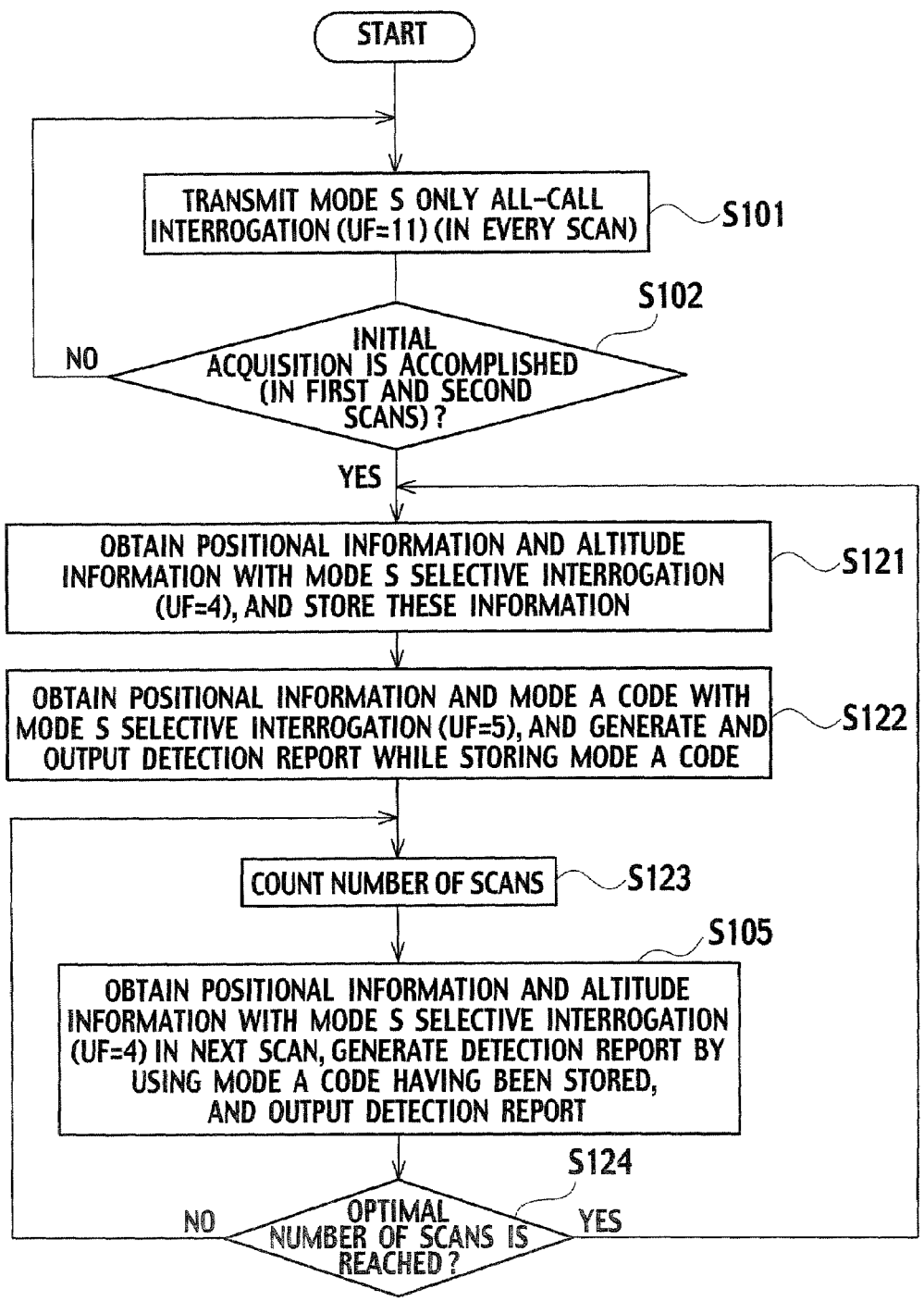
FIG. 8 is a flowchart showing a procedure for obtaining a Mode A code by the Mode S radar of the abovementioned second embodiment.
Figure 9:
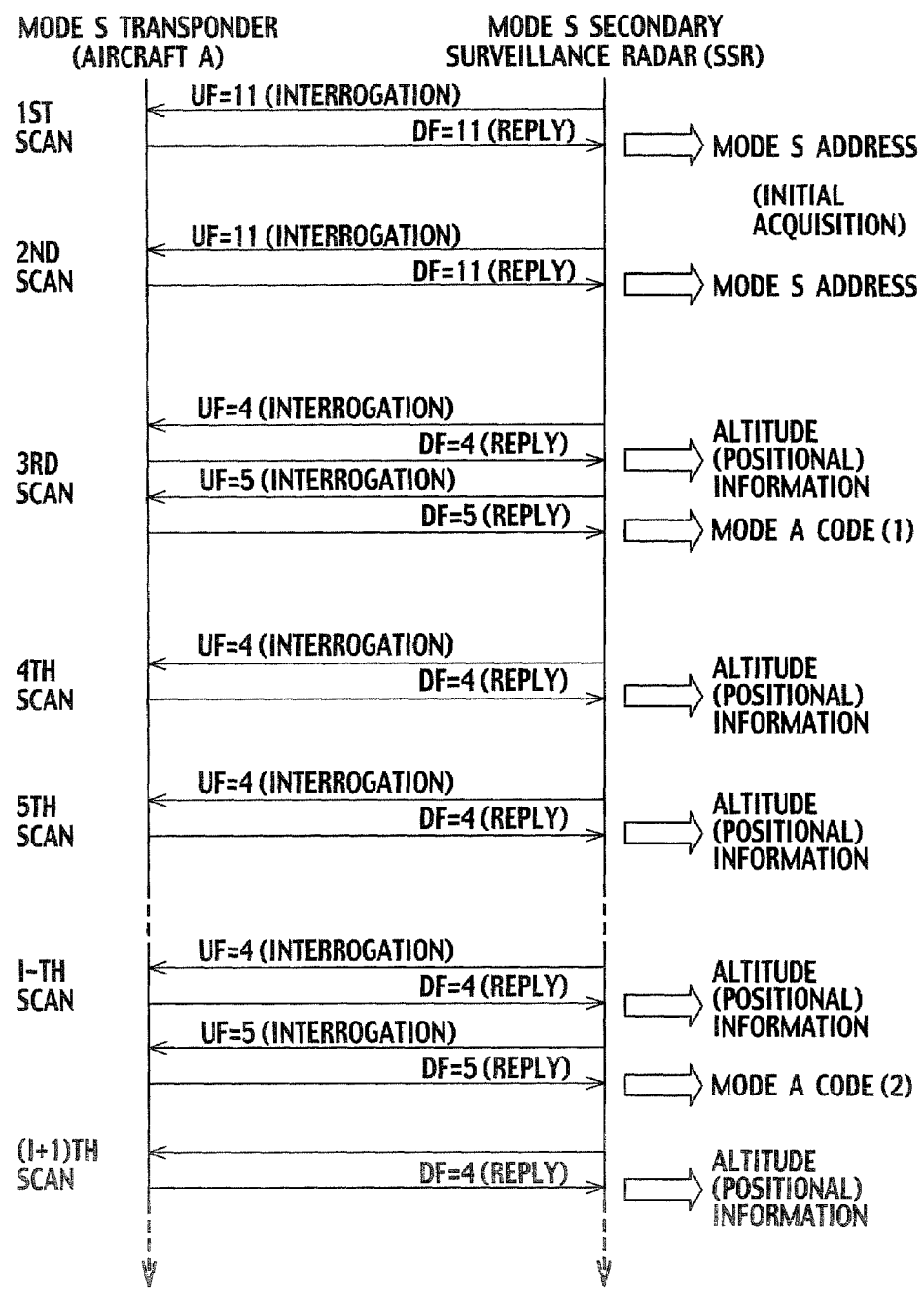
FIG. 9 is a sequence diagram showing the procedure for obtaining a Mode A code by the Mode S radar of the abovementioned second embodiment.

An operational procedure of the abovementioned Mode S radar will be described on the basis of a flowchart in FIG. 5, and with reference to a block diagram in FIG. 4, and a sequence diagram of interrogations and replies, which is shown in FIG. 6. As shown in FIGS. 8 and 9, as in the conventional case, a Mode S only all-call interrogation (UF=11) is transmitted in every scan (a first scan and a second scan) (step S101) so that a Mode S address and positional information are obtained from each reply (UF=11) obtained from the aircraft (a Mode-S-transponder-equipped aircraft) A. Then, the correlation processor 6 judges whether or not the aircraft A is initially acquired (step S102).

When the result of the judgment in S102 is YES, that is, when it is judged that the aircraft A is initially acquired, the signal processor 5 schedules and transmits Mode S selective interrogations (UF=4 and UF=5) in order to obtain altitude information (ALT) and Mode A code data of the aircraft A in a scan (a third scan) immediately after the initial acquisition. Then, the signal processor 5 obtains the Mode A code data and the positional information including the altitude information of the aircraft A from replies, corresponding to the transmitted Mode S selective interrogations, from the aircraft A. Subsequently, the signal processor 5 feeds the information and the data to the operation processing circuit 61 of the correlation processor 6 so that the information and the data are stored in the memory 62 (step S103).

Note that, when the result of the judgment in S102 is NO, that is, when the initial acquisition does not exist, the signal processor 5 waits for outputs of the Mode S only all-call interrogation (UF=11)/replies (UF=11) in step S101.

After step S103, the operation processing circuit 61 of the correlation processor 6 reads out the Mode A code data stored in the memory 62. The operation processing circuit 61 then generates a detection report on the aircraft A by using this read-out data along with the positional information and the altitude information thus obtained. The operation processing circuit 61 transmits the detection report toward an unillustrated air traffic control system through the transmission controller 7 (step S104).

In a scan (a fourth scan) subsequent to the third scan, the signal processor 5 schedules and transmits a Mode S selective interrogation (UF=5) in order to obtain Mode A code data on the aircraft A as in step S103. Then, the signal processor 5 obtains the Mode A code data on the aircraft A from a reply, corresponding to the thus transmitted Mode S selective interrogation, from the aircraft A. The signal processor 5 feeds the data to the operation processing circuit 61 of the correlation processor 6 so that the data is stored in the memory 62 (step S111).

When the operation processing circuit 61 of the correlation processor 6 receives from the signal processor 5 the positional information and the altitude information on the aircraft A, which have been obtained with the Mode S selective interrogation (UF=4), the operation processing circuit 61 reads out the Mode A code data having been stored in the memory 62, generates a detection report on the aircraft A by using these information and this data, and transmits the detection report toward the unillustrated air traffic control system through the transmission controller 7 (step S112).

Subsequently, the comparison judgment circuit 63 receives data from the operation processing circuit 61, and judges whether or not the Mode A codes obtained respectively in the foregoing two scans agree with each other to be identical (step S113).

If the result of the judgment in step S113 is YES, with identicalness existing between the Mode A codes having been obtained in the foregoing two scans because the Mode A codes agree with each other, the processing moves on to step S105. In step S105, the signal processor 5 transmits the Mode S selective interrogation (UF=4) for obtaining altitude information (ALT) toward the aircraft A in each of fifth and later scans shown in FIG. 6. Then, the signal processor 5 decodes a reply (DF=4), corresponding to the thus transmitted mode S selective interrogation (UF=4), from the aircraft A, and feeds the decoded reply to the operation processing circuit 61 of the correlation processor 6.

Then the operation processing circuit 61 repeats the following operation. The operation processing circuit 61 generates a detection report on the aircraft A from the positional information including the altitude information of the aircraft A, and the Mode A code obtained by the scan immediately before and stored in the memory 62. Thereafter, the operation processing circuit 61 transmits the generated detection report toward the unillustrated air traffic control system through the transmission controller 7. Note that, normally, the processing in step S105 is repeated in every scan while the target aircraft is being acquired.

When the result of the judgment in step S113 is NO, that is, when there is no identicalness existing between the Mode A codes obtained in the foregoing two scans because the Mode A codes do not agree with each other, the processing moves on to step S114. In step S114, the positional information and a Mode A code are obtained anew by the Mode S selective interrogation (UF=5) in a scan next to the foregoing scans, and then the process moves on to step S112.

As has been described above, according to the Mode S second surveillance radar of this embodiment, the Mode A code data obtained from two times of surveillance in an initial scan (the third scan) immediately after the initial acquisition and in a scan (the fourth scan) subsequent to the third scan, respectively, are stored in the memory 62, and a detection report is generated as well. Then, concurrently with this, in surveillance in each scan of the fifth and later scans, only after identicalness is found to exist between Mode A codes obtained in the previous two scans (the third and fourth scans), this identical Mode A code data is read out from the memory 62, and a detection report is generated. Accordingly, in each of those fifth and later scans, the Mode A code requesting interrogation (UF=5) to the acquired aircraft A and a reply from the acquired aircraft A can be omitted. This makes it possible to save a time period when the RF channel is occupied for air-to-ground signal exchanges. Additionally, since a detection report is generated with the Mode A code data, with which agreement, that is, identicalness is found to exist, and which are obtained with Mode S selective interrogations in the plurality of scans (the third and fourth scans), the generated detection report becomes more accurate, whereby reliability of aircraft surveillance can be considerably enhanced.

That is, an error rate of an interrogation or a reply in the Mode S radar is $10^{-7}$. However, according to this embodiment, it is judged whether or not Mode A codes agree with each other in two scans. Only after the agreement between the Mode A codes is found to exist, the identical Mode A code is read out, and is then utilized for the generating of a detection report, in every scan. Accordingly, an error rate of Mode A codes to be used thereafter can be considerably improved to $10^{-14}$. As a result, reliability of the detection report is enhanced.

Note that, in the abovementioned embodiment, the Mode A code data obtained in the initial scan (the third scan) after the initial acquisition is stored, and the thus stored Mode A code data is read out and utilized in each of the scans subsequent thereto. This Mode A code is previously assigned to the aircraft before takeoff, and is basically not supposed to be changed. However, if an operation of altering the Mode A code has been made by a pilot after the Mode S radar obtains this Mode A code after the initial acquisition, an Alert status is brought about and the flight status information changes. Accordingly, the Mode S radar can recognize the alteration. When the Mode A code is altered, or when tracking of the aircraft A is lost midway through the tracking, the Mode S selective interrogation (UF=5) for obtaining the Mode A code is again carried out as well. For this reason, the embodiment is applicable also to those cases.

Additionally, although an example is shown here where judgment on the identicalness between the Mode A code data is made on the basis of two scans, reliability of Mode A code data obtained can be further enhanced if the judgment is made on the basis of three or more scans.

Furthermore, the correlation processor 6 has been described on the assumption that the correlation processor 6 operates on a hardware configuration composed of the operation processor 61, the memory 62 and the comparison judgment 63. However, the correlation processor 6 can also be achieved on computer software in reality.

In any cases, according to the Mode S radar of this embodiment, the generation of a detection report (a target report) using Mode A code read out from the memory after the initial acquisition is carried out on condition that agreement between the Mode A code data has been found to exit by Mode S selective interrogations over a plurality of scans performed on a Mode-S-transponder-equipped aircraft after the initial acquisition. Accordingly, the Mode S radar of this embodiment is capable of generating detection information on the aircraft A with high accuracy while suppressing an increase in time period when the RF channel is occupied. Thereby, the Mode S radar of this embodiment can contribute to the securing of safety of aircrafts in air traffic control.

Second Embodiment

A Mode S radar of a second embodiment of this invention will be described with reference to FIGS. 7 to 9. The Mode S radar of this embodiment is characterized by including the following functions. When attempting to acquire initially (or again after coast) a Mode-S-transponder-equipped aircraft in an area covered by the Mode S radar, the Mode S radar obtains a Mode S address and positional information on the aircraft with a Mode S only all-call interrogation (UF=11). After generating the track of the aircraft with the Mode S only all-call interrogation, the Mode S radar obtains altitude information (DF=4). In addition, the number of scans starts to be counted from a time point when Mode A code data (DF=5) is obtained. Once the counted number of scans becomes equal to a preset optimal number of scans, the Mode S radar again carries out interrogation/reply (UF=5/DF=5) for requesting a Mode A code so as to re-obtain Mode A code data.

Figure 7:
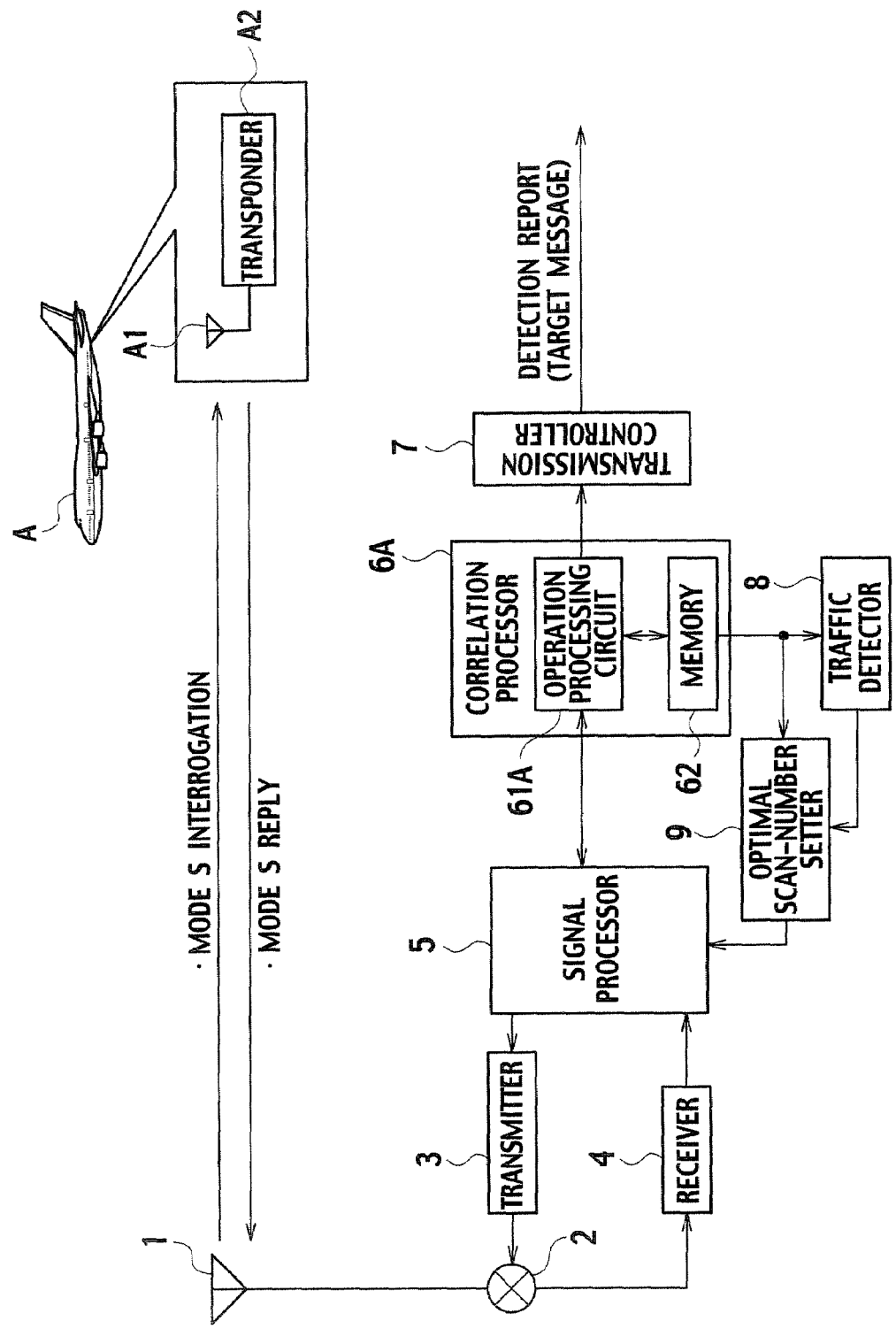
FIG. 7 is a block diagram of a Mode S radar of a second embodiment of the present invention.

As shown in FIG. 7, the Mode S radar of this embodiment includes an antenna 1, a transmission/reception switch 2, a transmitter 3, a receiver 4, a signal processor 5, a correlation processor 6A and a transmission controller 7. The antenna 1 corresponds with the antenna 1 of the first embodiment. The transmission/reception switch 2 is connected to the antenna 1. The transmitter 3 and the receiver 4 are connected to the transmission/reception switch 2. The signal processor 5 is connected to the transmitter 3 and the receiver 4. The correlation processor 6A is connected to the signal processor 5, and the transmission controller 7 is connected to the correlation processor 6A. The correlation processor 6A includes an operation processing circuit 61A and a memory (a memory circuit) 62, which are formed of a computer.

Furthermore, the Mode S radar of this embodiment is characterized by including a traffic detector 8 and an optimal scan-number setter 9. The traffic detector 8 detects a traffic volume in the coverage area of the radar on the basis of a history file having been stored in the memory 62 of the correlation processor 6A. The optimal scan-number setter 9 sets an interval (the optimal number of scans), at which Mode A codes are re-obtained, while leaving room to be allocated for Mode A data links in the RF channel, on the basis of the history file in the memory 62, and also of traffic detected by the traffic detector 8. The optimal scan-number setter 9 also counts the number of scans to provide a Mode A code obtaining instruction to the signal processor 5 every time the number of scans reaches the optimal number of scans.

Processing by the signal processor 5 for transmission of Mode S interrogations and reception of Mode S replies is the same as that in the first embodiment. However, the second embodiment is different from the first embodiment in that, when the optimal scan-number setter 9 provides the Mode A code obtaining instruction, the signal processor 5 transmits not only an altitude requesting interrogation with a Mode S selective interrogation of UF=4 but also a Mode A code requesting interrogation with a Mode S selective interrogation of UF=5, so as to perform, every time the optimal number of scans is reached, processing of obtaining Mode A code data, as well as of obtaining altitude information. Once Mode A code data is obtained, this Mode A code data is kept stored in the memory 62 until the optimal number of scans is reached again, and Mode S selective interrogations (UF=5) are never transmitted to the aircraft A for acquiring a Mode A code from the transmitter 3 in the subsequent scans. Instead, the Mode A code having been stored in the memory 62 is read out, and is reflected in a detection report (a target message) to be outputted.

The traffic detector 8 detects, in real time, traffic in the coverage area of the radar from information, such as the number of Mode S targets, which is obtained from the history file in the memory 62 of the correlation processor 6A. Furthermore, the traffic detector 8 calculates a roll-call period to be allocated to the Mode S data links and a roll-call period to be allocated to the re-obtaining of the Mode A code data from the status of the thus detected traffic, and automatically computes the optimal number of scans on a periodic basis. The optimal scan-number setter 9 sets the optimal number of scans computed by the traffic detector 8, and counts the number of scans. Then, the optimal scan-number setter 9 provides a Mode A code obtaining instruction to the signal processor 5 every time the number of scans reaches the optimal number of scans. Note that, since the processing is a little complicated as has been described above, this embodiment may have a configuration where the optimal number of scans can be fixedly or variably preset in the optimal scan-number setter 9. In that case, the traffic detector 8 is unnecessary.

An operational procedure of the Mode S radar of this embodiment will be described on the basis of a flowchart in FIG. 8, as well as with reference to a block diagram in FIG. 7, and to a sequence diagram of interrogations and replies which is shown in FIG. 9. As the initial acquisition, the Mode S radar normally carries out a Mode S only all-call interrogation (UF=11) to a Mode S transponder A2 of the Mode-S-transponder-equipped aircraft A in each of the first scan and the second scan, and starts tracking of the Mode-S-transponder-equipped aircraft A in response to a Mode S reply (DF=11) received from the Mode S transponder A2. Target information obtained at this time is only positional information and a Mode S address (steps S101 and S102).

From the third scan and onward, the Mode S radar carries out, as Mode S selective interrogations, an altitude requesting interrogation (UF=4) and a Mode A code requesting interrogation (UF=5) by using a predicted track. The Mode S radar thereby obtains an altitude reply (DF=4) and a Mode A code reply (DF=5) which are necessary for air traffic control. The Mode S radar then sets the altitude information and the Mode A code data on a detection report (a target message). Then, at the same time as sending out the detection report to a radar information processing system, the Mode S radar retains, in the memory 62, the Mode A code data (=a Mode A code (1)) obtained in the third scan. Thereafter, the Mode S radar copies this data to put this data on a detection report for a scan following the third scan (steps S121 and S122).

Subsequently, the optimal scan-number setter 9 starts counting the number of scans after obtainment of the Mode A code (1) (step S123).

In every scan until the optimal scan-number setter 9 provides a Mode A code re-obtaining instruction in response to the event that the optimal number of scans is reached, the signal processor 5 carries out, as a Mode S selective interrogation, only the altitude requesting interrogation (UF=4) so as to obtain the altitude reply (DF=4). Then, while putting information of the altitude reply on a detection report, the correlation processor 6A reads out the Mode A code (1) having been retained in the memory 62, copies and outputs this code (1) onto the detection report (step S105).

Once the optimal scan-number setter 9 judges that the optimal number of scan is reached and then provides the Mode A code re-obtaining instruction to the signal processor 5 in S124, the process moves back to processing following step S121. Mode A code data re-obtained are sequentially stored in the memory 62 to be updated as a Mode A code (2), a Mode A code (3) and so on.

At this time, the traffic detector 8 receives, from the correlation processor 6A of the Mode S radar, traffic information of the coverage area of the radar. The traffic detector 8 then calculates a roll-call period necessary for data links with individual aircrafts, allocates the remaining roll-call period to a roll call to be used for re-obtaining a Mode A code, calculates an interval for the re-obtaining, then sets the interval as the optimal number of scans in the optimal scan-number setter 9. Note that, since the traffic status changes continually, the traffic detector 8 updates detection of the traffic status at regular intervals.

According to the Mode S radar of this embodiment, an interval between Mode A code re-obtaining interrogations to the aircraft is set to an appropriate value and is implemented so that a necessary capacity (a roll-call period for data links other than a period for surveillance roll calls) of a data link channel, which is calculated with the traffic in an airspace of the coverage area of the radar can be secured in accordance with a setup environment of each individual one of the Mode S radars. For this reason, it is possible to achieve a good balance between the enhancement in reliability of a Mode A code and the securing of the data link channel, by adequately updating the Mode A code.

Note that the optimal scan-number setter 9 can be designed to have a configuration where the optimal number of scans calculated in advance in accordance with a setup environment of the Mode S radar is preset. In that case, the system can be simplified because the configuration does not require periodical detection of the traffic.

What is claimed is:

1. A Mode S radar which specifies an aircraft by transmitting interrogations to a Mode S transponder installed in an aircraft, by receiving replies to the interrogations, and by then decoding the contents of the received replies, the Mode S radar comprising:

acquisition means, which transmits a Mode S only all-call interrogation, and which thereby accomplishes an initial acquisition of an aircraft equipped with a Mode S transponder (a Mode-S-transponder-equipped aircraft);

first obtainment means, which transmits UF=4 interrogations as Mode S selective interrogations to the Mode-S-transponder-equipped aircraft with the initial acquisition having been accomplished by the acquisition means, and which thereby obtains DF=4 replies from the Mode-S-transponder-equipped aircraft;

second obtainment means, which, until an identicalness judgment is issued, transmits UF=5 interrogations as Mode S selective interrogations with each UF=4 interrogation to the Mode-S-transponder-equipped aircraft, and which thereby obtains Mode A codes as DF=5 replies from the Mode-S-transponder-equipped aircraft;

judgment means, which judges whether or not an identicalness exists among predetermined plural Mode A codes obtained by the second obtainment means and issues the identicalness judgment to the second obtainment means; and generation means, which stores, in a memory, data with identicalness having been judged to exist by the judgment means, and which then generates a report obtained by substituting the Mode A code with identicalness having been judged to exist, as a detection report on the aircraft in each of scans following the obtainment.

2. The Mode S radar according to claim 1, wherein the existence of identicalness is judged, by the judgment means, between Mode A codes obtained by the second obtainment means in a two successive scans.

3. The Mode S radar according to claim 1 or claim 2, wherein information on the aircraft is obtained in the first scan after the initial acquisition is accomplished.

4. The Mode S radar according to claim 1 or claim 2, wherein a first Mode A code among the plural Mode A codes obtained by the second obtainment means for judging whether or not the identicalness exists is any one of a Mode A code obtained in the first scan immediately after a flight status of the aircraft has changed, and a Mode A code obtained in the first scan after the tracking of the aircraft with the replies is lost midway through the tracking.

* * * * *